(12) United States Patent  
Reeder

(10) Patent No.: US 9,995,502 B1  
(45) Date of Patent: Jun. 12, 2018

(54) ENTHALPY MEASUREMENT AND SYSTEM CONTROL

(71) Applicant: Alarm.com Incorporated, Tysons, VA (US)

(72) Inventor: Alexander Lawrence Reeder, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 209 days.

(21) Appl. No.: 15/165,964

(22) Filed: May 26, 2016

Related U.S. Application Data

(60) Provisional application No. 62/166,348, filed on May 26, 2015.

(51) Int. Cl.
| | |
|---|---|
| *F24F 11/30* | (2018.01) |
| *G02B 15/02* | (2006.01) |
| *G05B 15/02* | (2006.01) |

(52) U.S. Cl.
CPC .............. *F24F 11/30* (2018.01); *G05B 15/02* (2013.01); *F24F 2110/10* (2018.01); *F24F 2110/20* (2018.01)

(58) Field of Classification Search
CPC .... F24F 11/0012; F24F 11/0015; F24F 11/30; F24F 2110/10; F24F 2110/20; G05B 15/02
See application file for complete search history.

(56) References Cited

U.S. PATENT DOCUMENTS

| | | | | |
|---|---|---|---|---|
| 2010/0307733 | A1* | 12/2010 | Karamanos | F24F 13/04 165/254 |
| 2011/0155354 | A1* | 6/2011 | Karamanos | F24F 3/052 165/121 |
| 2013/0098597 | A1* | 4/2013 | Fujimoto | H05K 7/20745 165/287 |
| 2015/0096714 | A1* | 4/2015 | Dagley | F24F 12/003 165/8 |
| 2016/0290668 | A1* | 10/2016 | Taylor | F24F 11/006 |

* cited by examiner

*Primary Examiner* — Charles Kasenge  
(74) *Attorney, Agent, or Firm* — Fish & Richardson P.C.

(57) ABSTRACT

Methods, systems, and apparatus, including computer programs encoded on a computer storage medium, for tracking computing enthalpy measurements indicating abnormalities associated with operation of a heating, ventilating, and cooling (HVAC) system. In some implementations, a computer-implemented method includes: obtaining, from one or more sensors associated with the HVAC system, (i) temperature data including a source vent temperature measurement and a return vent temperature of the HVAC system, and (ii) humidity data including a source vent humidity measurement and a return vent humidity measurement of the HVAC system; computing an enthalpy measurement associated with operation of the HVAC system; determining that the computed enthalpy measurement indicates an efficiency issue associated with operation of the HVAC system; and in response to determining that the computed enthalpy measurement indicates the efficiency issue associated with operation of the HVAC system, taking action related to the HVAC system.

18 Claims, 11 Drawing Sheets ically obtaining the temperature and humidity data over a particular period of time, and determining that the computed enthalpy measurement indicates an efficiency issue associated with operation of the HVAC system includes determining that the computed enthalpy measurements indicates an efficiency issue associated with operation of the HVAC system over the particular period of time.

In some implementations, the enthalpy measurement includes an amount of sensible heat removed by the HVAC system from at least a portion of a property associated with the HVAC system.

In some implementations, the enthalpy measurement includes an amount of latent heat removed by the HVAC system from at least a portion of a property associated with the HVAC system.

In some implementations, the method may further include computing a relative HVAC system efficiency score based at least on the computed enthalpy measurement.

In some implementations, the HVAC system efficiency score indicates heating or cooling losses that contribute to system inefficiency associated with operation of the HVAC system.

In some implementations, computing the relative HVAC system efficiency score includes comparing the obtained temperature data and humidity data to reference temperature data and reference humidity data that are each associated with predetermined efficient operation of the HVAC system.

In some implementations, the one or more sensors associated with the HVAC system comprise an anemometer that determines a volumetric airflow produced by the HVAC system.

In some implementations, the method further includes: obtaining, from the anemometer, airspeed data that includes a source vent airspeed measurement and a return vent airspeed measurement associated with the HVAC system; and computing the enthalpy measurement associated with operation of the HVAC system is based at least on the obtained airspeed data.

In some implementations, determining that the computed enthalpy measurement indicates an efficiency issue associated with operation of the HVAC system includes: comparing the obtained temperature data against reference data that includes a user-defined set point temperature; determining that a difference between a value of the user-defined set point temperature and a value of either the return vent temperature or the source vent temperature exceeds a predetermined threshold; and in response to determining that the difference exceeds the predetermined threshold, identifying an efficiency issue associated with operation of the HVAC system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Techniques are described for employing temperature and humidity sensors at source vents and air return vents at multiple locations within a property to calculate and monitor the enthalpy delta achieved by an HVAC unit. The sensors may send real-time temperature and humidity data to a thermostat control panel for processing, monitoring, and analysis. HVAC units may be used within a property to provide heating and cooling operations. For example, HVAC units may use a refrigeration cycle to remove heat from the air that is being circulated over evaporator coils to cool the air within the property. HVAC units may also heat the air inside vents using a furnace or other heating element, and transmit heated air within the property through the source vents. However, in some instances, the HVAC unit within a property may operate inefficiently during heating and cooling cycles, which may result in uncomfortable conditions, energy waste at the end of heating or cooling cycles, or set point overshoot.

Accordingly, techniques are described to monitor temperature and humidity at source vents and return vents of a HVAC unit to monitor enthalpy measurements to track HVAC health, identify and quantify sources that reduce efficiency, and develop an optimized cooling scheme for an individual property. For example, a monitoring system control unit may calculate the amount of sensible heat removed by the HVAC unit based on the difference in temperatures between the source and return vents measured by the temperature sensor. In addition, the monitoring system control unit may calculate the latent heat by calculating the water vapor contained in the heat removed using the differences in humidity measured at the source and return vents by the humidity sensor. The monitoring system control unit may use these measurements to compute enthalpy delta and monitor relative HVAC system efficiency.

Figure 1:
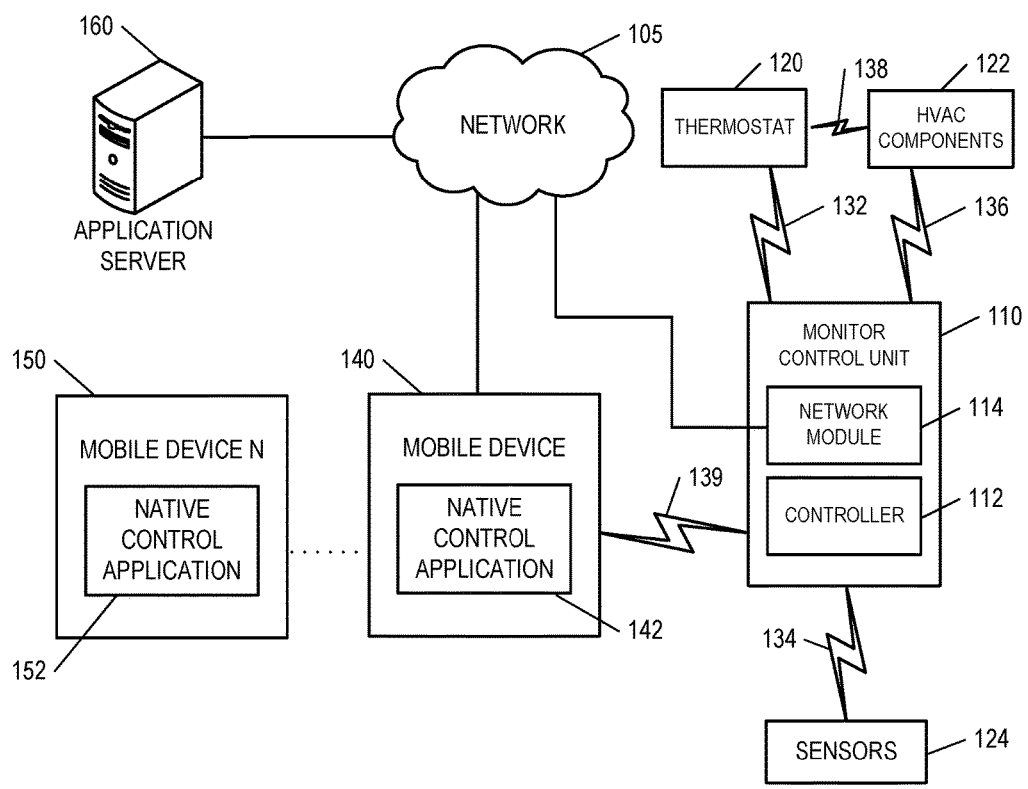
FIG. 1 illustrates an example of a monitoring system.

FIG. 1 illustrates an example of a system 100 that may be configured to monitor enthalpy data for a HVAC unit. The system 100 may include a network 105, a monitor control unit 110, a thermostat 120, HVAC components 122, sensors 124, one or more mobile devices 140, 150, and a thermostat application server 160. The network 105 may be configured to enable electronic communications between devices connected to the network 105. For example, the network 105 may be configured to enable exchange of electronic communications between the monitor control unit 110, the one or more mobile devices 140, 150, and the thermostat application server 160.

The network 105 may include, for example, one or more of the Internet, Wide Area Networks (WANs), Local Area Networks (LANs), Wi-Fi, analog or digital wired and wireless telephone networks, a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may also be a wireless network, a broadband network, or a combination of networks including a wireless network and a broadband network.

The monitor control unit 110 may include a controller 112 and a network module 114. The controller 112 may be configured to control a system, e.g., an HVAC unit associated with a property that includes the monitor control unit 110. In some examples, the controller 112 may include a processor or other control circuitry configured to execute instructions of a program that controls operation of the HVAC unit. In these examples, the controller 112 may be configured to receive input from sensors, detectors, or other devices associated with the HVAC unit and control operation of components of the HVAC unit, e.g., a temperature sensor, a furnace, an evaporator coil, a heat exchanger, a condensing unit, or other devices associated with the property, such as appliances, lights, etc. For example, the controller 112 may be configured to control operation of the network module 114 included in the monitor control unit 110.

The network module 114 may be a communication device configured to exchange communications over the network 105. The network module 114 may be a wireless communication module configured to exchange wireless communications over the network 105. For example, the network module 114 may be a wireless communication device configured to exchange communications over a wireless data channel. In this example, the network module 114 may transmit user location data within or external to the property, environmental data from the property, e.g., indoors at the property or outdoors at the property, or other data over a wireless data channel. The wireless communication device may include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitor control unit 110 to communicate over a local area network and/or the Internet. The network module 114 also may be a voiceband modem configured to enable the monitor control unit 110 to communicate over the telephone lines of Plain Old Telephone Systems (POTS). In some implementations, the monitor control unit 110 may be a broadband or cellular gateway where the network module 114 may enable the monitor control unit 110 to communicate over the network 105.

The system 100 may communicate with a thermostat 120 and sensors 124 to monitor the temperature and humidity measured at source and return vents of the HVAC unit. The sensors 124 may be temperature and humidity sensors placed on the source and return vents. The sensors 124 may be configured to monitor the temperature and humidity during successive heating/cooling cycles of the HVAC unit. The temperature and humidity of the source and return vents may be measured periodically (e.g., one minute intervals), or measured within a time frame before and after a heating/cooling cycle by the HVAC unit.

In some implementations, the temperature and humidity sensors on the source and return vents may be configured to calculate heating/cooling loses that may contribute to HVAC unit inefficiency during a heating or cooling cycle. In these implementations, the temperature and humidity sensors may be configured in a distributed network across different source and return vents of rooms within the property. For example, the difference in temperature between the source and the return vent in individual rooms may indicate heat loss or gain within that particular room. In another example, the difference in humidity may be combined with the temperature difference to identify what proportion of the HVAC load is due to air leaks, versus insulation or radiation losses within the room.

In some instances, the temperature and humidity measured by the sensors 124 may be compared to expected values to determine the specific causes of inefficient HVAC performance. For example, the monitor control unit 110 may set ranges of values for the difference between the expected values and the calculated values to classify HVAC unit performance. In another example, the monitor control unit 110 may track the differences between the calculated and expected values to determine changes in HVAC unit efficiency. In such examples, the monitor control unit 110 may diagnose specific causes for reductions in efficiency based on how rapidly the measured values deviate from the expected values. For instance, a gradual loss of cooling power over may indicate deterioration in the compressor, whereas a persistent deficiency may indicate intake leaks or poor insulation in ductwork. In such instances, the monitor control unit 110 and/or the application server 160 may prepare activity reports and transmit notifications to property owners based on the severity of the identified causes.

In some implementations, the sensors 124 may incorporate anemometers to provide contextual meanings to temperature and humidity data generated by the sensors 124. For example, in a multi-stage system, the sensors 124 may identify the current operating stage. The system 100 may also estimate the absolute efficiency of the system based on the volumetric air flow inferred from the airspeed data collected by the anemometers. The sensors 124 may also identify when there are too many shuttered vents, which cause risk for system damage. In addition, the sensors 124 may be used to identify when the fan is on, but the AC compressor or heating element is not. Depending on the accuracy, the sensors 124 may be able to identify if there is a blockage in the system (e.g., dirty filter).

In some instances, the sensors 124 may be configured to determine wind speed data based on the required accuracy and size requirements. For example, the sensors 124 may include a windmill-style tachometer, spring-wound pressure paddle, a Pitot tube pressure sensor, or other anemometer technologies.

The thermostat 120, HVAC components 122, and the sensors 124 may communicate with the controller 112 over communications links 132, 134, and 136, respectively, and the thermostat 120 may communicate with the HVAC components 122 over the communication link 138. The communication links 132, 134, 136, and 138 may be wired or wireless data pathways configured to transmit signals between the thermostat 120, the sensors 124, and the HVAC components 122. The sensors 124, and the thermostat 120 may periodically transmit sensed values to the controller 112, or may transmit sensed values to the controller 112 in response to a change in a sensed value.

In some implementations, the HVAC components 122 may include a compressor with a temperature sensor to measure the temperature difference between the air surrounding the compressor and the air indoors measured by the temperature sensors on the source and return vents. In such implementations, the amount of heat removed per unit may be measured and used in controlling the operations of the HVAC unit components. For instance, since heat is more efficiently removed during times when the outdoor temperature is cooler, the compressor may be operated during the morning when the outdoor temperature is low, and minimally operated during the afternoon when the temperature is much higher. In such instances, the monitor control unit 110 may track the system efficiency using the temperature measurements and control the operations of the HVAC components 122 based on a cooling/heating scheme to reduce the total energy, or total cost of energy consumed by the system 100.

In some implementations, the sensors 124 include temperature and humidity sensors placed on the walls and windows of the property to determine the percentage of the HVAC load that is due to outside air infiltration and heat transfer. In these implementations, the sensors 124 may use water vapor as a tracer and determine the composition of the air inside and outside the property. For instance, the sensors 124 may use the percentage of water vapor in the air to calculate the latent heat. In another instance, the operation of the HVAC components 122 may be adjusted based on the air infiltration or the heat transfer from outside the property. For example, if the monitor control unit 110 determines that the HVAC load includes a significant portion of air infiltration from outside, then it may reduce the operations of the HVAC components 122 to conserve energy, instead of attempting to maintain the previously designated set point.

The monitor control unit 110 may monitor the operation of the thermostat 120, the sensors 124 and the HVAC components 122 based on exchanging communications with the thermostat 120 and the sensors 124. For example, the monitor control unit 110 may receive the measured temperature and humidity at the source and return vents of the HVAC unit. In response to determining the temperature and humidity, the monitor control unit 110 may calculate the enthalpy delta between the source vents and return vents over time. The monitor control unit 110 may use the calculated enthalpy measurements to control the operations of the thermostat 120 or the HVAC components 122.

In some implementations, the HVAC components 122 may include a fan and a furnace, or other heating element, that is dynamically controlled by the monitor control unit 110 based on the data collected from the sensors 124. For instance, the furnace may include a temperature sensor to measure the temperature of vent air produced during a heating cycle. In response, the monitor control unit 110 may control the operations of HVAC components 122 to maximize the power generated during a heating cycle. For example, after the heat exchanger reaches a threshold temperature, the monitor control unit 110 may continue to operate the HVAC fan to circulate heated air even though the furnace may be turned off after the heating cycle has completed. The operation of the fan may continue after a heating cycle based on the temperature detected by the on-vent temperature sensors. In such an instance, the fan may continue to operate until the detected on-vent temperature reaches below a certain threshold value. In another instance, the operation of the fan may continue after a cooling cycle.

The thermostat application server 160 may be an electronic device configured to provide control services by exchanging electronic communications with the monitor control unit 110 and the one or more mobile devices 140, 150 over the network 105. For example, the thermostat application server 160 may be configured to monitor data obtained by the monitor control unit 110. In this example, the thermostat application server 160 may exchange electronic communications with the network module 114 included in the monitor control unit 110 to send and/or receive information regarding activity at the property and/or the environment at the property. The thermostat application server 160 also may receive information regarding activity within or external to the property from the one or more mobile devices 140, 150. For example, the thermostat application server 160 may receive information from the one or more mobile devices 140, 150 that indicates the locations of the one or more mobile devices 140, 150.

The one or more mobile devices 140, 150 may be devices that host one or more native applications, e.g., the native applications 142, 152. The one or more mobile devices 140, 150 may be cellular phones or non-cellular locally networked devices. The one or more mobile devices 140, 150 may include a cell phone, a smart phone, a tablet PC, a personal digital assistant ("PDA"), or any other portable device configured to communicate over a network. For example, implementations also may include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 140, 150 may be the same or may include mobile devices of different types. The one or more mobile devices 140, 150 may perform functions unrelated to the system 100, such as placing personal telephone calls, playing music, playing video, displaying pictures, browsing the Internet, maintaining an electronic calendar, etc.

In some implementations, the one or more mobile devices 140, 150 may communicate with and receive data from the monitor control unit 110 using the communication link 138. For instance, the one or more mobile devices 140, 150 may communicate with the monitor control unit 110 using various local wireless protocols, such as Wi-Fi, Bluetooth, Z-Wave, ZigBee, or wired protocols such as Ethernet, USB, and other wired protocols based on the RS232, RS485, and/or RS422 standards. The one or more mobile devices 140, 150 may connect locally to the system 100 and its sensors and other devices. The local connection may improve the speed of communications because communicating through the network 105 with a remote server, e.g., the thermostat application server 160, may be slower.

Although the one or more mobile devices 140, 150 are shown communicating with the monitor control unit 110, the one or more mobile devices 140, 150 may communicate directly with the sensors and other devices controlled by the monitor control unit 110. In some implementations, the one or more mobile devices 140, 150 may replace the monitor control unit 110 and perform the functions of the monitor control unit 110 for local control and long range or offsite communication.

In other implementations, the one or more mobile devices 140, 150 may receive system 100 data captured by the monitor control unit 110 through the network 105. The one or more mobile devices 140, 150 may receive the data from the monitor control unit 110 through the network 105 or the application server 110 and may relay data received from the monitor control unit 110 to the one or more mobile devices 140, 150 through the network 105. In this regard, the thermostat application server 160 may facilitate communications between the one or more mobile devices 140, 150 and the monitor control unit 110.

Although the one or more mobile devices 140, 150 are shown in FIG. 1 as being connected to the network 105, in some implementations, the one or more mobile devices 140, 150 are not connected to the network 105. In these implementations, the one or more mobile devices 140, 150 may communicate directly with one or more of the system 100 components and no network connection, e.g., connection to the Internet, or reliance on remote servers is needed.

In some implementations the one or more mobile devices 140, 150 may be used in conjunction with only local sensors and/or local devices at a property. In these implementations, the system 100 may only include the one or more mobile devices 140, 150, the thermostat 120, the sensors 124, and the HVAC components 122. The one or more mobile devices 140, 150 may receive data directly from the thermostat 120, the sensors 124, and the HVAC components 122 and send data directly to the monitor control unit 110. The one or more mobile devices 140, 150 may provide the appropriate interfaces/processing to provide control information, modify settings, control HVAC unit component operations, etc.

In some implementations, a mobile device 140, 150 may be able to determine a geographic location associated with the mobile device 140, 150, and may communicate information identifying a geographic location associated with the mobile device 140, 150. For example, a mobile device 140, 150 may determine the current geographic location of the mobile device 140, 150 by using global positioning system (GPS) capabilities. In other implementations, a geographic location associated with a mobiles device 140, 150 may be determined using other methods, for example, by using Wi-Fi access point triangulation data, cellular network triangulation data, or IP address information, when the mobile device 140, 150 has network connectivity. The mobile device 140, 150 may transmit data identifying the geographic location of the mobile device 140, 150 over the network 105 to the thermostat application server 160, or to the monitor control unit 110.

The one or more mobile devices 140, 150 may each include a native application 142, 152, respectively. The native application 142, 152 refers to a software/firmware program running on the corresponding mobile devices that enables the features described throughout. The one or more mobile devices 140, 150 may load or install the native application 142, 152 based on data received over a network or data received from local media. The native monitoring application 142, 152 may run on mobile devices' platforms, such as Apple iOS, iPhone, iPod touch, Blackberry, Google Android, Windows Mobile, etc.

The native application identifies a geographic location associated with the mobile device 142, 152 and communicates information identifying the geographic location. For example, a mobile device 140, 150 having the native application 142, 152 may determine a geographic location of the mobile device 140, 150 using GPS capabilities, and may communicate data identifying the geographic location to the thermostat application server 160. In some instances, the native application 142, 152 may check the location of the mobile device 140, 150 periodically and may automatically detect when a user associated with the mobile device 140, 150 is going toward or away from a property.

In some implementations, the sensors 124 may include temperature sensors that collect data from the HVAC components 122 to determine if they are performing abnormally based on the set point provided by a user. For example, the sensors 124 may track the operations of the HVAC components 122 and determine whether the system has stayed on or off for an inordinate amount of time. In response, the monitor control unit 110 may identify which of the one or more components has performed abnormally. The monitor control unit 110 may then send a notification to the one or more mobile devices 140, 150 to indicate that the HVAC unit may need service. For example, a property owner may receive a notification that the pipes within the property may be in risk of freezing in the winter when the owner is away from the property.

In some implementations, the sensors 124 may include multiple temperature and humidity sensors placed on the source and return vents within various zones throughout the property. In these implementations, the sensors 124 may track the stratification of temperatures within the homes resulting from the formation of thermoclines or uneven solar radiation during heating or cooling sessions. The sensors 124 of differ zones may periodically transmit temperature and humidity measurements to the monitor control unit 110, which may adjust the system operation settings to standardize the distribution of conditioned or heated air. For example, the monitor control unit 110 may enable the "fan-only" setting to mix the air of different zones without operating the air conditioning or the furnace to ensure that better mixed air keeps the indoor temperature consistent throughout the entire property.

In some instances, the sensors 124 may include configurations for multiple sensors based on the zone the sensor is located in within the property. In these instances, the property user may have the option to configure the HVAC unit based on the detected temperature and humidity within specific zones by designating its sensors as the "master." For example, the "master" designation may change throughout the day based on outside temperature, occupancy and/or specified user settings. In this example, a property owner may control the HVAC operations throughout the day based on specific zones to prevent overcooling or overheating the entire property and conserving energy from operating the HVAC unit on the entire property.

In some implementations, the sensors 124 may include temperature and humidity sensors on the source and return vents within the property as well as external sensors placed outside the property to detect the ambient temperature and humidity outside the property. In these implementations, the monitor control unit 110 may automatically adjust the set point of the thermostat 120 based on differences in temperature sensed by the internal temperature sensors and the external temperature sensors. For example, if the external sensors indicate that the temperature is significantly lower than the set point of the thermostat 120, the thermostat control unit may dynamically raise the set point to prevent a property owner from feeling colder than expected due to exchanging radiation with colder windows and walls and additional heat loss.

In some examples, the monitor control unit 110 may determine when to adjust the set point of the thermostat 120 based on a threshold-based process that adjusts the set point by a certain level (e.g., two degrees) when the outside temperature is below a threshold value for heating operations and above a threshold value for cooling operations. The adjustment may be a continuous process that calculates the set point change based on the specific temperature and wind conditions outside the property. Also, a thermodynamic model of the property may be used to determine an appropriate set point adjustment. The user may select to apply the adjustments under specified conditions (e.g., during certain times, when the outside temperature differs from the set point by a certain value, etc.).

Figure 2:
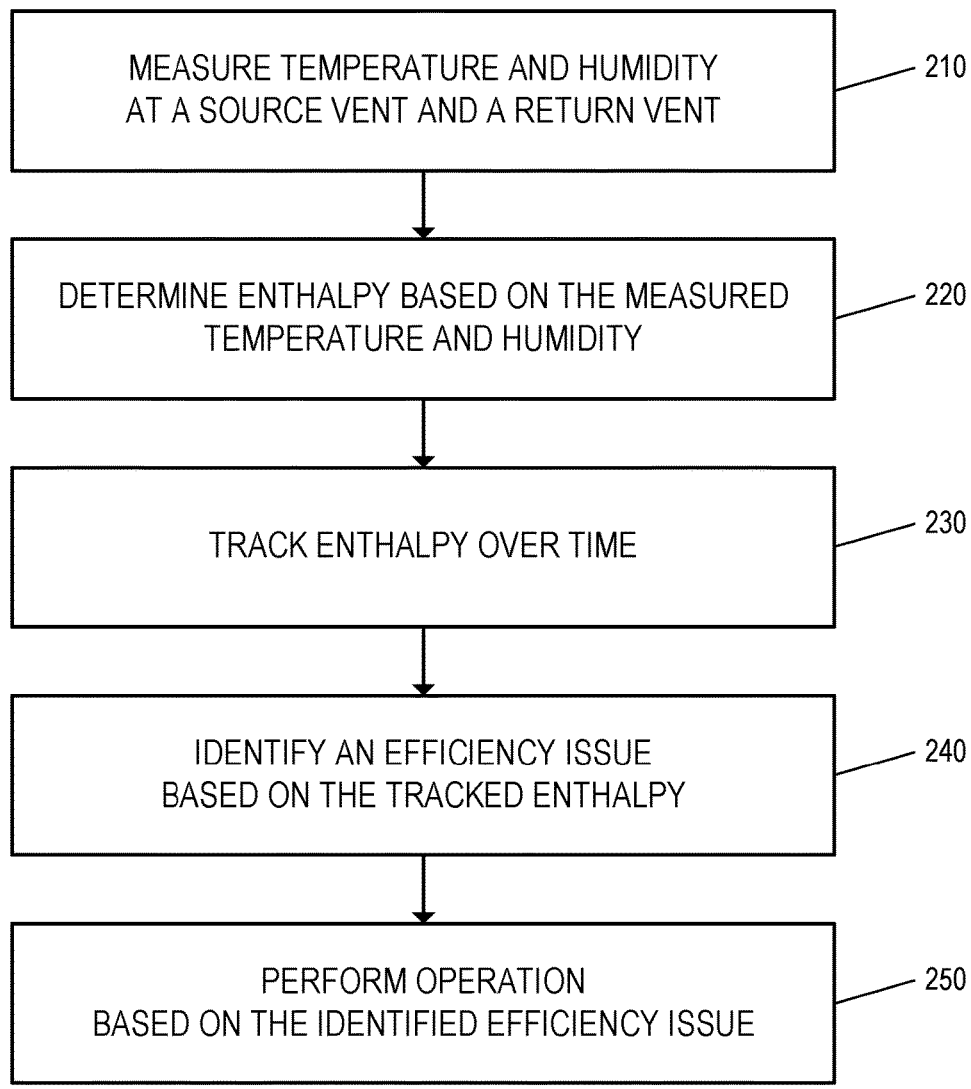
FIG. 2 illustrates an example of a process for monitoring enthalpy.

FIG. 2 illustrates an example process 200 that may be used for performing an operation based on enthalpy tracking. Although the operation of example processes 200, 400, 500, and 600 are described generally as being performed by the system 100, the operations of the example processes 200, 400, 500, and 600 may also be performed by one of the components of the system 100 (e.g., the monitor control unit 110) or may be performed by any combination of the components of the system 100. In some implementations, operations of the example processes 200, 400, 500, and 600 may be performed by one or more processors included in one or more electronic devices.

The system 100 may measure temperature and humidity at vent and return ducts (210). For example, the system 100 may include a temperature sensor and a humidity sensor at the source vents and the return vents to measure the temperature and humidity, respectively, at each location. The sensors may measure the temperature and humidity in real-time and transmit the measurements to the monitor control unit 110.

The system 100 may determine enthalpy based on the measured temperature and humidity (220). For example, the system 100 may initially calculate the latent heat in the air surrounding the return vent to determine the enthalpy of the air. For instance, the system 100 may determine the water content of the air using the following formula:

$$H_w = c_{we} t + h_{we}$$

Where $H_w$ represents the specific enthalpy of moist air, $c_{we}$ represents the specific heat of dry air, t represents the temperature measured, and $h_{we}$ represents the heat of vaporization of water.

The system 100 may track enthalpy over time (230). For example, the system 100 may continuously calculate the enthalpy at the source and return vents based on the instantaneous temperature and humidity measurements. For instance, the system 100 may store the measurements in an activity log and cache the generated log at specified intervals of time.

The system 100 may identify an efficiency issue based on the tracked enthalpy (240). For example, the system 100 may track the heat removed by a HVAC unit by calculating the enthalpy delta between the source and return vents. The system 100 may determine changes in efficiency by analyzing the magnitude of changes within a specified time period (e.g., hourly basis). The system 100 may attribute the changes in efficiencies to various expected causes. For instance, the system 100 may determine that a rapid decline in efficiency may be attributed to a coolant leak, which caused a sharp decrease in temperature measured at the return duct. In another instance, the system 100 may determine that a gradual decline in efficiency may be likely due to normal depreciation of the HVAC compressor.

The system 100 may perform an operation based on the identified efficiency issue (250). For example, the system 100 may classify decreases in efficiency based on the severity to the HVAC operations and send out user notifications accordingly. For example, the system 100 may designate a coolant leak as a severe issue that requires immediate service assistance, whereas the system 100 may designate depreciation in the compressor as a minor issue that requires an annual checkup. The system 100 may also transmit targeted notifications based on the severity. For instance, if the identified efficiency issue is critical to system operations, the system 100 may transmit a notification to one or more mobile devices 140, 150.

Figure 3A:
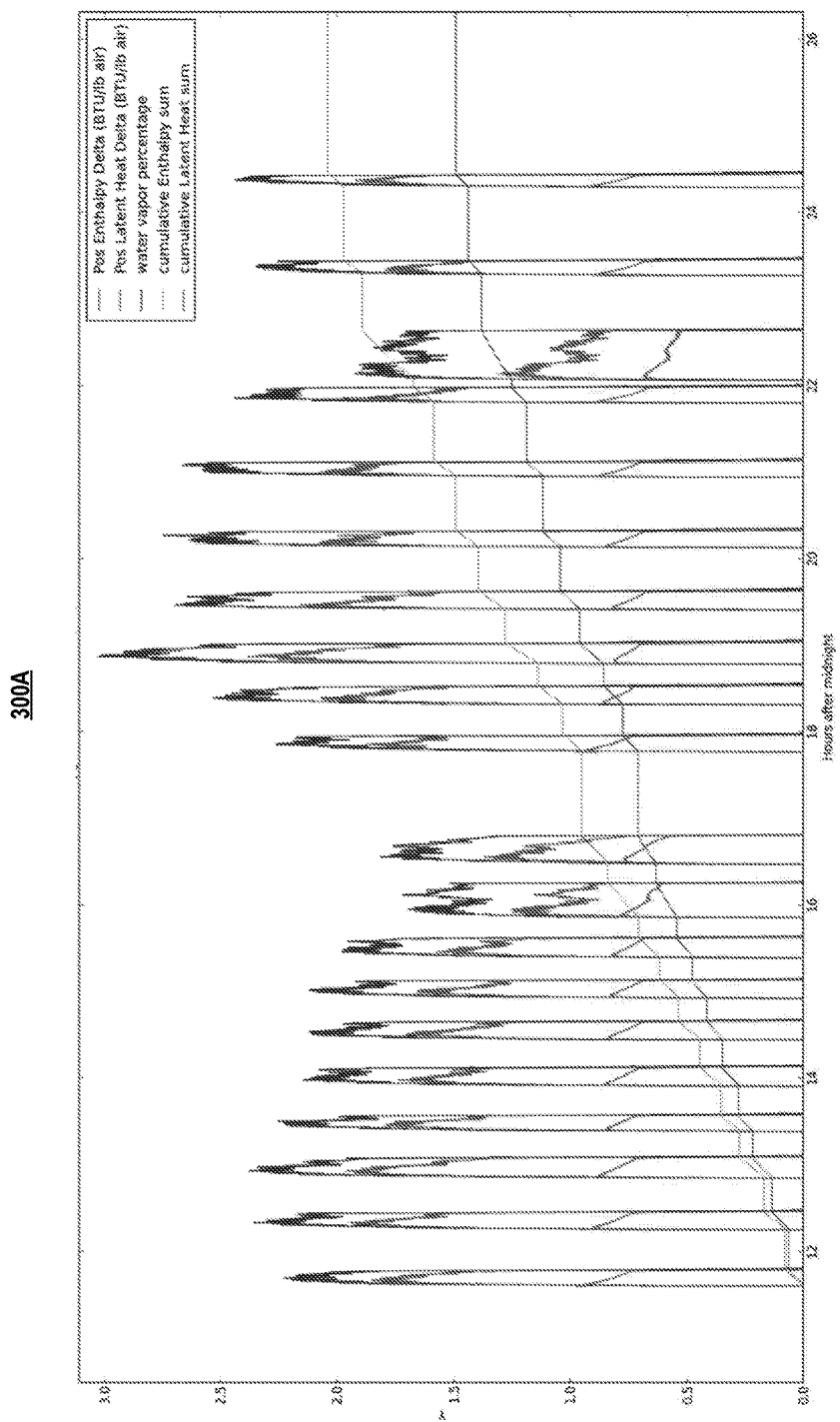
FIGS. 3A-3B illustrate example of enthalpy data for monitoring system efficiency.

FIG. 3A illustrates example enthalpy data for monitoring system efficiency. For example, the system 100 may measure an enthalpy delta, which represents the difference in the calculated enthalpy between the source vent and the return vent, and a latent heat delta, which represents the calculated latent heat difference between the source vent and the return vent. The system 100 may also calculate a water vapor percentage of the ambient air within the property, which is based on the measured humidity of the air at the return vent. The cumulative enthalpy and the cumulative latent heat sums may be calculated by adding the instantaneous enthalpy and latent heat deltas to a running total after each successive heating/cooling cycle of the HVAC system. The difference between the cumulative enthalpy sum and the cumulative latent heat sum represents the total energy used to remove sensible heat from the property. The cumulative latent heat sum represents the total energy used to remove water vapor from the air.

In some implementations, the system 100 may compare the calculated cumulative enthalpy and latent heat sums to pre-defined threshold values to determine when the HVAC unit requires service. For example, the system 100 may set threshold values based on the expected efficiency deterioration and track the values of the cumulative enthalpy and latent heat sums until the values surpass the threshold values.

Figure 3B:
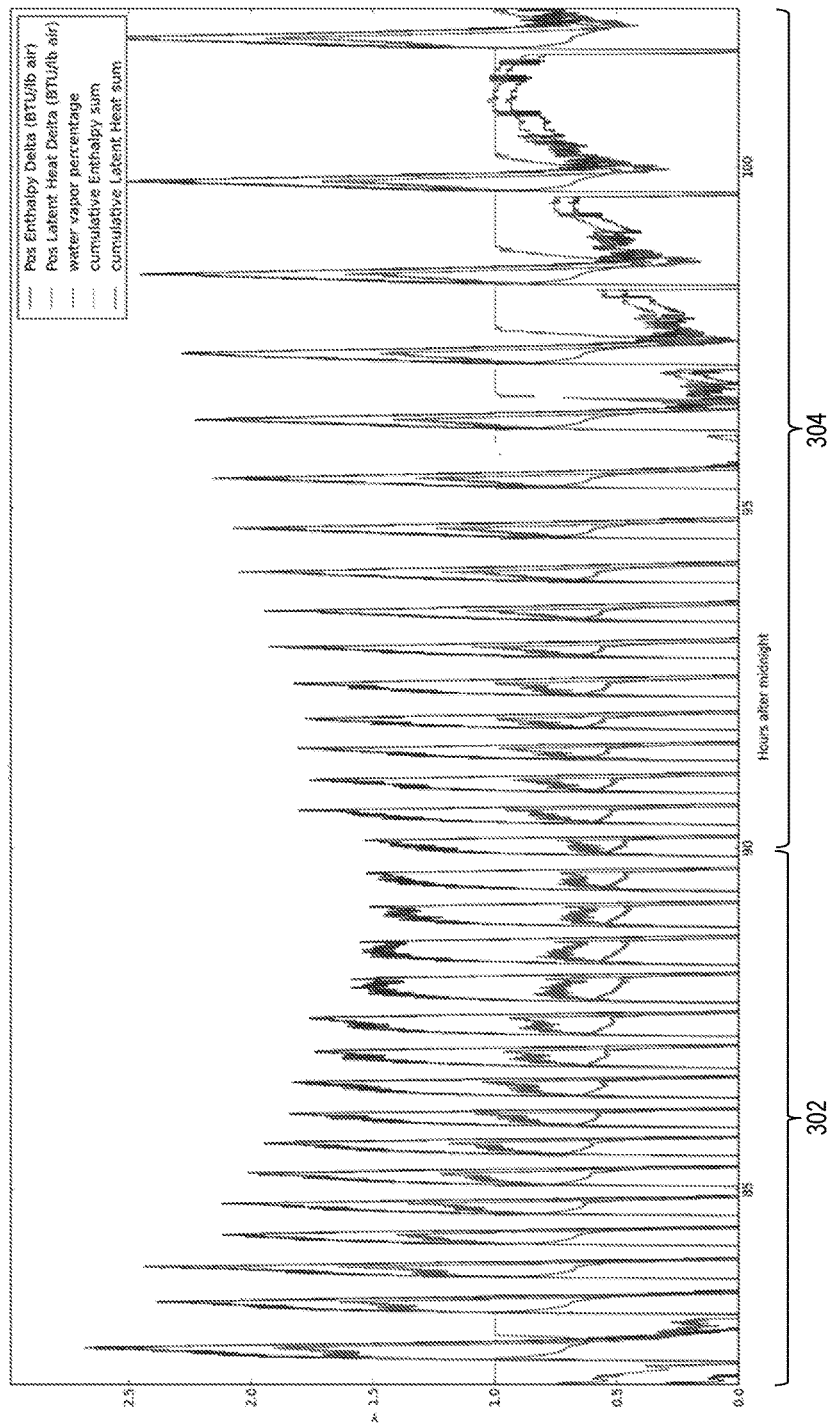

FIG. 3B illustrates example enthalpy data for different operations performed by the system 100. For example, FIG. 3B represents the relative effectiveness of an AC unit to remove heat from a property in relation to the temperature outside the property. As indicated in phases 302 and 304, as the outside temperature increases throughout the morning and then decreases throughout the evening, the amplitude of the "enthalpy removed" metric decreases and then increases respectively, for a constant set point temperature within the property.

Figure 4:
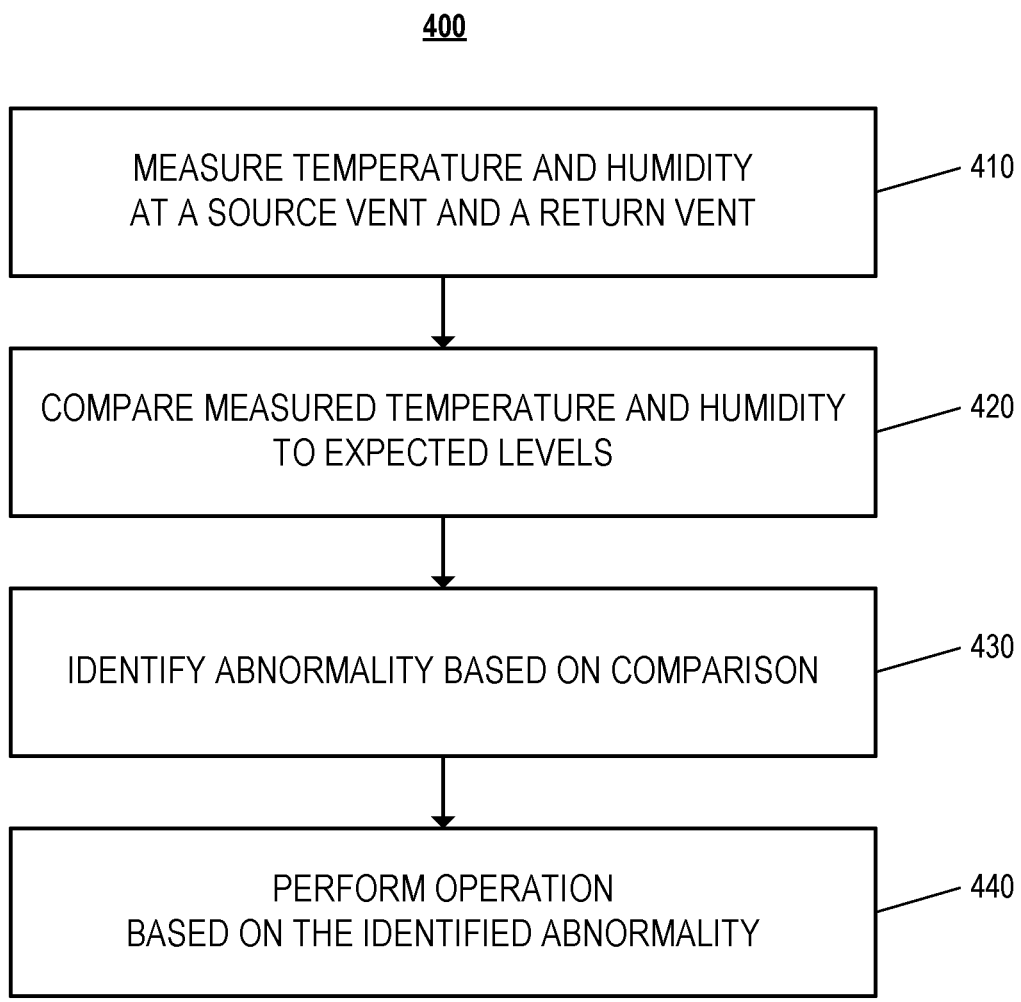
FIG. 4 illustrates an example of a process for identifying abnormalities.

FIG. 4 illustrates an example process 400 for performing an operation based on temperature and humidity abnormalities. The system 100 may measure temperature and humidity at a source vent and a return vent (410). For example, the system 100 may include a temperature sensor and a humidity sensor at the source vents and the return vents to measure the temperature and humidity, respectively, at each location. The sensors may measure the temperature and humidity in real-time and transmit the measurements to the monitor control unit 110.

The system 100 may compare measured temperature and humidity to expected levels (420). For example, the system 100 may determine expected temperature and humidity levels based on the settings of the thermostat and compare these expected levels to the measured temperature and humidity sensed by the sensors 124. In some instances, the system 100 may also determine the expected levels based on the ambient temperature outside the property or external weather conditions (e.g., precipitation, humidity, etc.).

The system 100 may identify an abnormality based on the comparison (430). For example, the system 100 may set a threshold difference between the expected levels and the measured temperature and humidity and identify an abnormality if the difference exceeds this threshold. The system 100 may identify the source of the abnormality by tracking the operations of the HVAC components 122 and determining the rate of change from the measured levels and the expected levels over time. For instance, the system 100 may identify a gradual change from expected levels over time that results as a consequence of system deterioration from normal usage, whereas the system 100 may identify a drastic change as component malfunctioning. In some instances, the system 100 may also determine if one of the HVAC components 122 has been on or off for an inordinate amount of time to determine if it may be abnormally functioning.

The system 100 may perform an operation based on the identified abnormality (440). For example, in response to the identified abnormality, the system 100 may transmit a notification to the property owner indicating the identified abnormality that includes an instruction to take action. If the identified abnormality is gradual change from expected levels over time, the system 100 may direct the property owner to schedule a service appointment. If the identified abnormality is a drastic change due to component malfunctioning, the system 100 may transmit a warning to the property owner indicating that there may be risk of system damage due to component failure.

In some implementations, the operation performed by the system 100 may be dictated by the severity of the identified abnormality. For instance, a drastic change in temperatures and pressures may be identified as a high priority abnormality, whereas a gradual change may be identified as a low priority abnormality. In response, the system 100 may transmit different notifications or warnings to the property owners based on the criticality of the identified abnormality.

Figure 5:
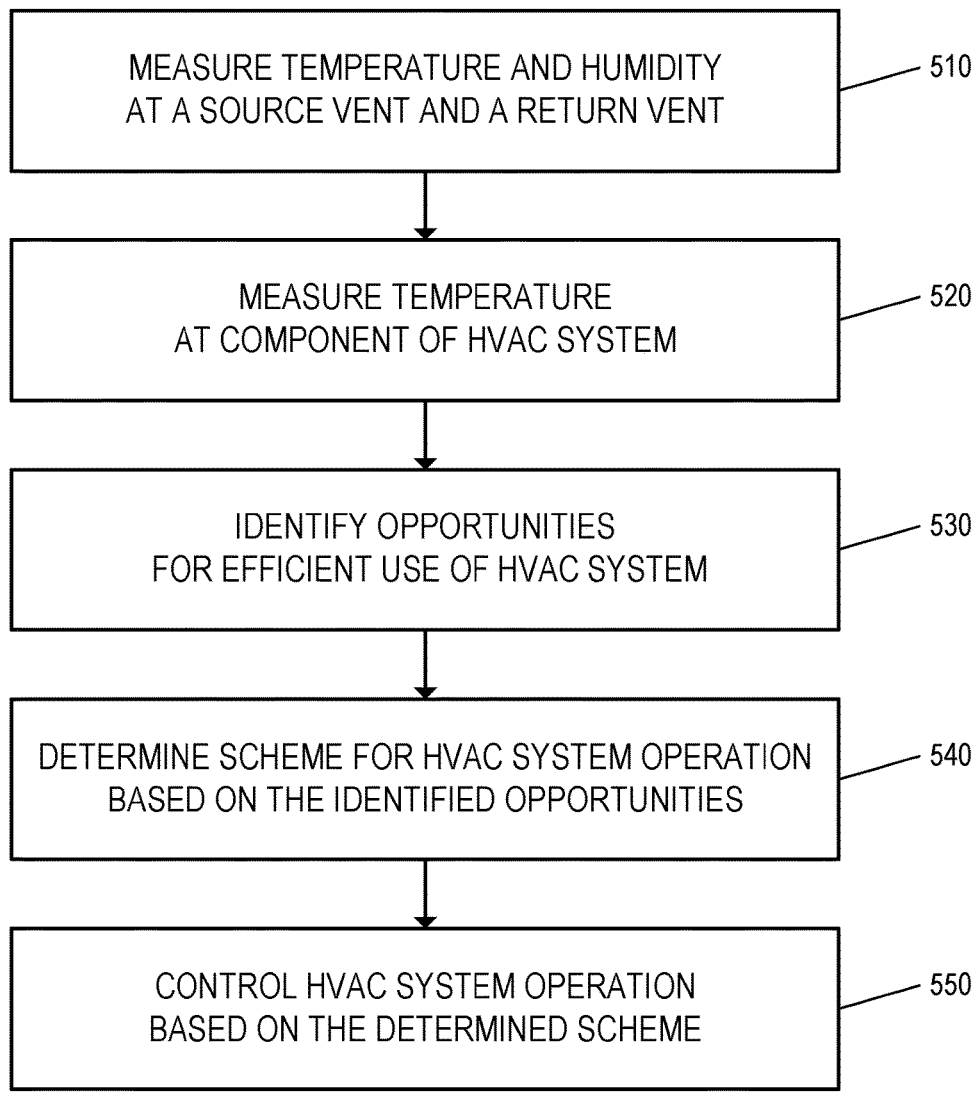
FIG. 5 illustrates an example of a process for determining an efficient operating scheme.

FIG. 5 illustrates an example process 500 for determining an efficient operating scheme for an HVAC unit.

The system 100 may measure temperature and humidity at a source vent and a return vent (510). For example, the system 100 may include a temperature sensor and a humidity sensor at the source vents and the return vents to measure the temperature and humidity, respectively, at each location. The sensors may measure the temperature and humidity in real-time and transmit the measurements to the thermostat monitoring system control unit 110.

The system 100 may measure temperature at a component of an HVAC unit (520). For example, the system 100 may include a temperature sensor on one of the HVAC components 122 to measure the temperature of the air produced by an HVAC unit during a heating or cooling event. For instance, a temperature sensor may measure the air produced by an air conditioner or a furnace or other heating element once the monitor control unit 110 activates the HVAC unit to reach the set point of the thermostat 120.

The system 100 may identify opportunities for efficient use of the HVAC unit (530). For example, the temperature sensor on one of the HVAC components 122 may transmit the measured air temperature to the monitor control unit 110, which may compare the temperature to the temperature detected by the sensors 124 on the source vent and the return vent. For instance, the system 100 may compare the air temperature at the HVAC component and the air temperature at the source vent to determine whether any loss due to air leakage or inefficient operations occurs. The system 100 also may compare the air temperature at the HVAC component to the air temperature exiting the vents to determine if there may be insufficient insulation within the air ducts and/or if there may be losses due to insufficient cooling or heating air production by the HVAC furnace or the compressor.

The system 100 may determine a scheme for HVAC unit operation based on the identified opportunities (540). For example, based on the type of event performed by the HVAC unit (e.g., heating or cooling), and the HVAC components that are operating, the system 100 may perform an initial calculation to determine potential reductions in energy. For instance, if the furnace is generating hot air during a heating event, the system 100 may identify opportunities for reducing system fuel consumption, electricity usage, or identify potential losses within the home that may impact the heating operation. In some instances, the system 100 may determine a scheme that combines different efficiency techniques that may lead to the most efficient operation.

The system 100 may control HVAC unit operation based on the determined scheme (550). For example, the system 100 may use the temperature sensor on the HVAC component to control the operation of a HVAC fan to improve system efficiency and conserve energy. For example, at the end of a heating event, the temperature sensor on the HVAC component may measure the air temperature near the heat exchanger to determine if there is usable energy in the heat exchanger based determining that the measured temperature of the heated air at the source vent exceeds a temperature threshold (e.g., 120° F.). In this example, the system 100 may continue to operate the HVAC fan to circulate the heated air for a particular amount of time to reduce the energy required to deliver the maximum amount of heat to the property. For instance, the HVAC fan may continue to operate for five to seven minutes after the furnace has turned off to utilize the available energy, or may duty cycle the furnace or heating element while keeping the HVAC fan on continuously in order to maintain a comfortable environment while preventing excessive fuel consumption.

Figure 6:
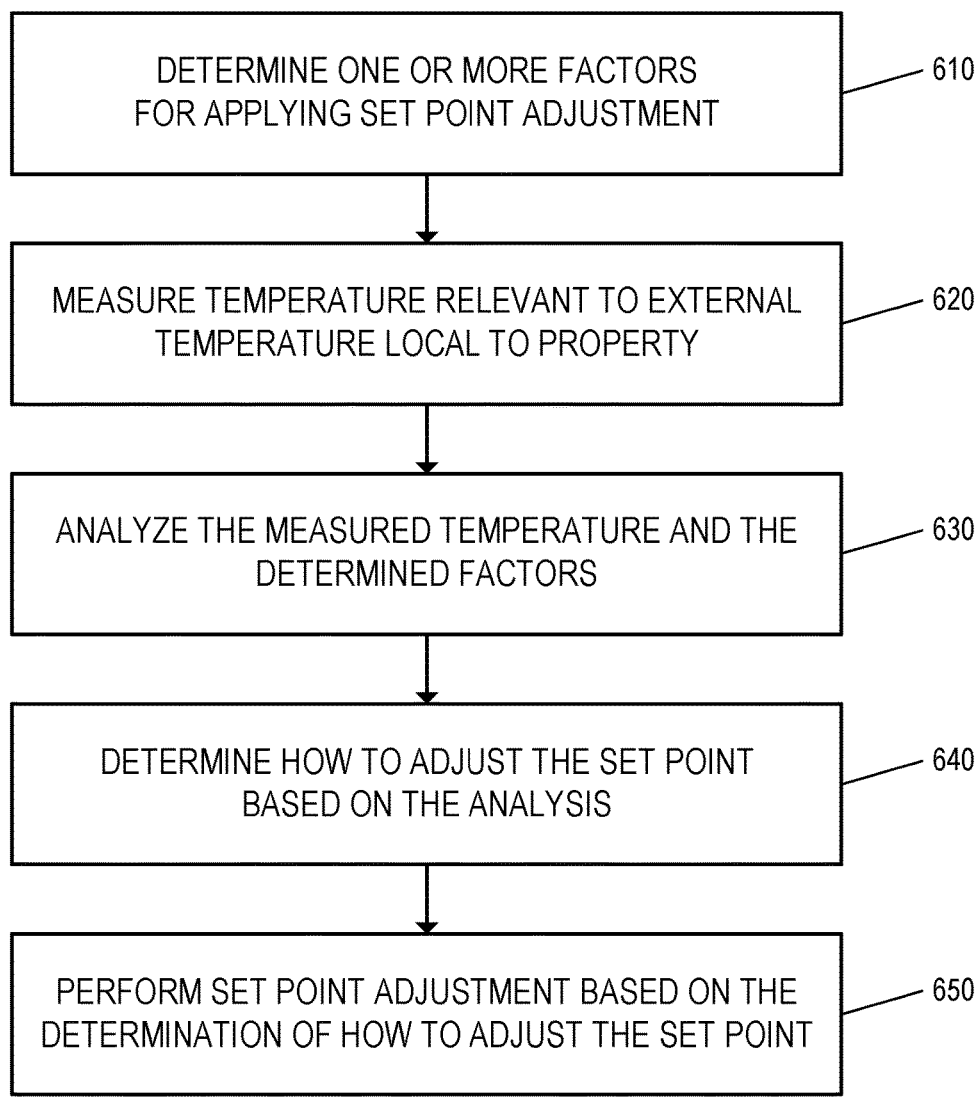
FIG. 6 illustrates an example of a process for performing set point adjustment.

FIG. 6 illustrates an example process 600 for performing set point adjustment. The system 100 may determine one or more factors for applying set point adjustment (610). For example, the system 100 may collect information from the local weather (e.g., wind chill factor, precipitation information, humidity, and/or sun radiation level), which may indicate that the set point temperature may not accurately reflect the preferences of the property owner. In some instances, the system 100 may apply different weights to the different factors based on calculating the probability that the specific factor may alter the set point temperature within the property.

The system 100 may measure temperature relevant to external temperature local to property (620). For example, the system 100 may include external temperatures that measure the temperature outside the property to determine if the local weather may alter the preferences of the property owner at the set point.

The system 100 may analyze the measured temperature and the determined factors (630). For example, the system 100 may compare the difference between the measured external temperatures to the temperature measured at the return vents within the property to a threshold value that represents the point where the set temperature may need to be adjusted. The system 100 may also measure the determined factors (e.g., wind chill factor, precipitation information, humidity, and/or sun radiation level) and determine if the factors may exaggerate the calculated temperature difference between the external temperature and the temperature at the return vent within the property. For instance, if sun radiation level is determined to be very high, the system 100 may determine that the impact on the temperature may be greater based on the sun radiation creating extra heat transmission into the property.

The system 100 may determine how to adjust the set point based on the analysis (640). For example, the system 100 may adjust the set point temperature of the thermostat 120 to counteract the determined factors that may impact the property owner's set point preferences within the property. For instance, the adjustment may be a threshold-based process that adjusts the set point by a particular amount (e.g., two degrees) when the external temperature is either above a threshold temperature for a cooling operation or below a threshold temperature for a heating operation. In addition, the adjustment may be a continuous process that calculates a set point adjustment based on a combination of the external temperature the determined factors that may alter the property owner's preferences of the temperature. In this regard, the system 100 may attempt to achieve a "feels like" temperature that matches the user's comfort level, although the measured temperature may differ from the set point established by the user.

The system 100 may perform set point adjustment based on the determination of how to adjust the set point (650). For example, the system 100 may increase or decrease the set point temperature on the thermostat 120 by a particular amount (e.g., two degrees). In some instances, the set point adjustment may be performed based on rules specified by the user. For example, the particular amount for adjustment may be varied based on the time period when the adjustment takes place (e.g., three degrees during the day and ten degrees during the night). Also, the set point adjustment may take place based on data collected by external and internal sensors within the property. For example, if a radiation sensor mounted on the exterior wall of the property detects excessive sun light, the set point adjustment for a cooling operation may be increased to factor in heat transmission from the sunlight within the property.

Figure 7:
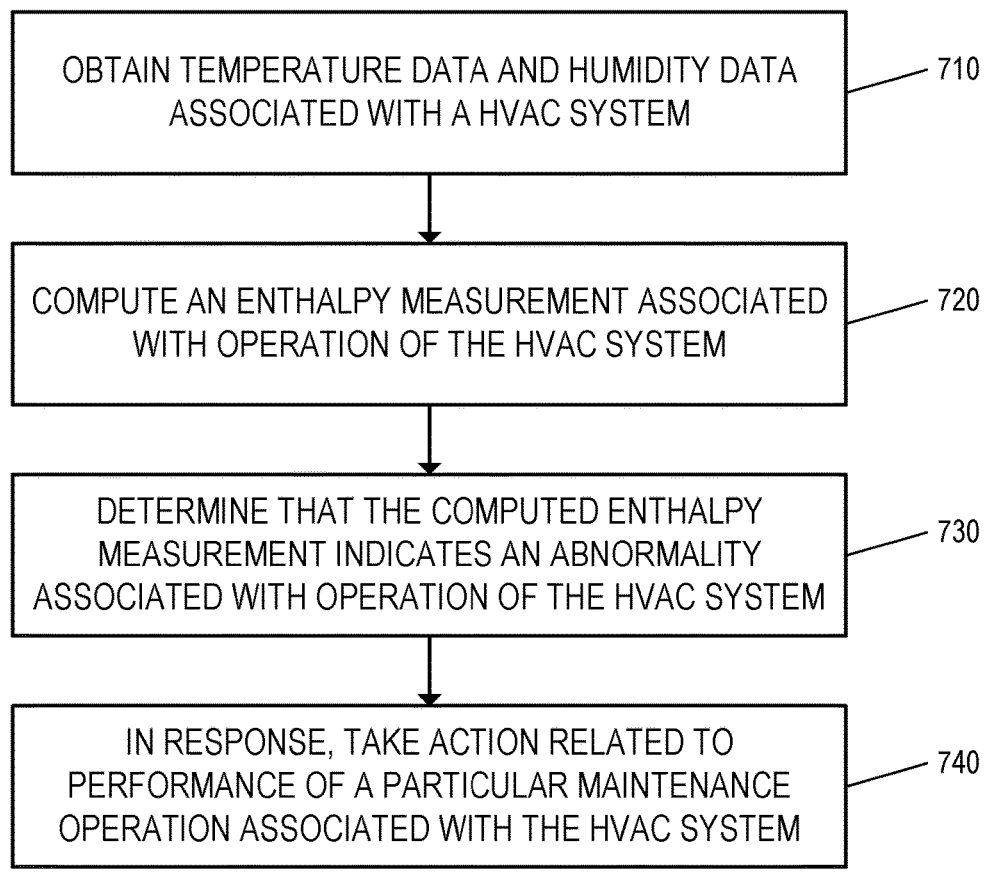
FIG. 7 illustrates an example of a process for computing enthalpy measurements

FIG. 7 illustrates an example of a process 700 for computing enthalpy measurements. Briefly, the process 700 may include obtaining temperature data and humidity data associated with a HVAC system (710), computing an enthalpy measurement associated with operation of the HVAC system (720), determining that the computed enthalpy measurement indicates an abnormality associated with operation of the HVAC system (730), and in response, taking action related to performance of a particular maintenance operation associated with the HVAC system (740).

In more detail, the process 700 may include obtaining temperature data and humidity data associated with a HVAC system (710). For instance, the application server 160 may obtain temperature data and humidity data from the thermostat 120 and the sensors 124 associated with the HVAC components 122. As described previously with respect to FIG. 1, the temperature data may include a source vent temperature measurement and a return vent temperature measurement associated with the HVAC system of the HVAC components 122. The humidity data may include a source vent humidity measurement and a return vent humidity measurement associated with the HVAC system. The measurements may be instantaneous measurements (e.g., current temperature and current humidity), or periodic measurements over a particular period of time (e.g., hourly temperature and humidity measurements over the course of a day).

The process 700 may include computing an enthalpy measurement associated with operation of the HVAC system (720). For instance, either the application server 160 or the monitor control unit 110 may compute an enthalpy measurement based on the obtained temperature data and the humidity data collected by the thermostat 120 and the HVAC components 122. As described previously with respect to FIG. 2, examples of enthalpy measurements include amount of sensible heat or latent heat produced by the HVAC components 122.

The process 700 may include determining that the computed enthalpy measurement indicates an abnormality associated with operation of the HVAC system (730). For instance, either the applications server 160 or the monitor control unit 110 may determine that the computed enthalpy measurement indicate an abnormality associated with operation of the HVAC components 122. As described previously with respect to FIG. 4, examples of abnormalities can include temperature or humidity abnormalities such as excessively high or low measurements from the thermostat 120 and/or the sensors 124 compared to a configured temperature or humidity setting for the HVAC system.

In some implementations, the application server 160 or the monitor control unit 110 may determine abnormalities associated with operation of the HVAC components 122 based on temperature data that includes a user-defined set point temperature configured on the thermostat 120. For example, the application server 160 or the monitor control unit 110 may compare temperature data and humidity data obtained from the thermostat 120, the HVAC components 122, and the sensors 124, and the temperature data that includes the user-defined set point temperature. The application server 160 or the monitor control unit 110 may then compute that a difference between a value of the user-defined set point temperature and a value of a measured HVAC return vent temperature or a HVAC source vent temperature. In response to determining that the difference exceeds a predetermined threshold (e.g., ten degrees Fahrenheit), the application server 160 or the monitor control unit 110 may identify an abnormality associated with operation of one or more of the HVAC components 122.

The process 700 may include taking action related to performance of a particular maintenance operation associated with the HVAC system in response to determining that the computed enthalpy measurement indicates an abnormality associated with operation of the HVAC system (740). For instance, in response to determining the enthalpy measurement indicates an abnormality associated with an operation of the HVAC components 122, the application server 160 or the monitor control unit 110 may take action related to performance of a particular of a particular maintenance operation associated with the HVAC components 122. As described previously with respect to FIG. 1, examples of actions taken may include transmitting an instruction to the HVAC components 122 to perform an automatic maintenance operation, transmitting a notification or alert to a user associated with the property where the HVAC components 122 are located, dynamically adjusting one or more system settings that adjust operation of the HVAC components 122, among other actions that are responsive to address the determined abnormality.

Figure 8:
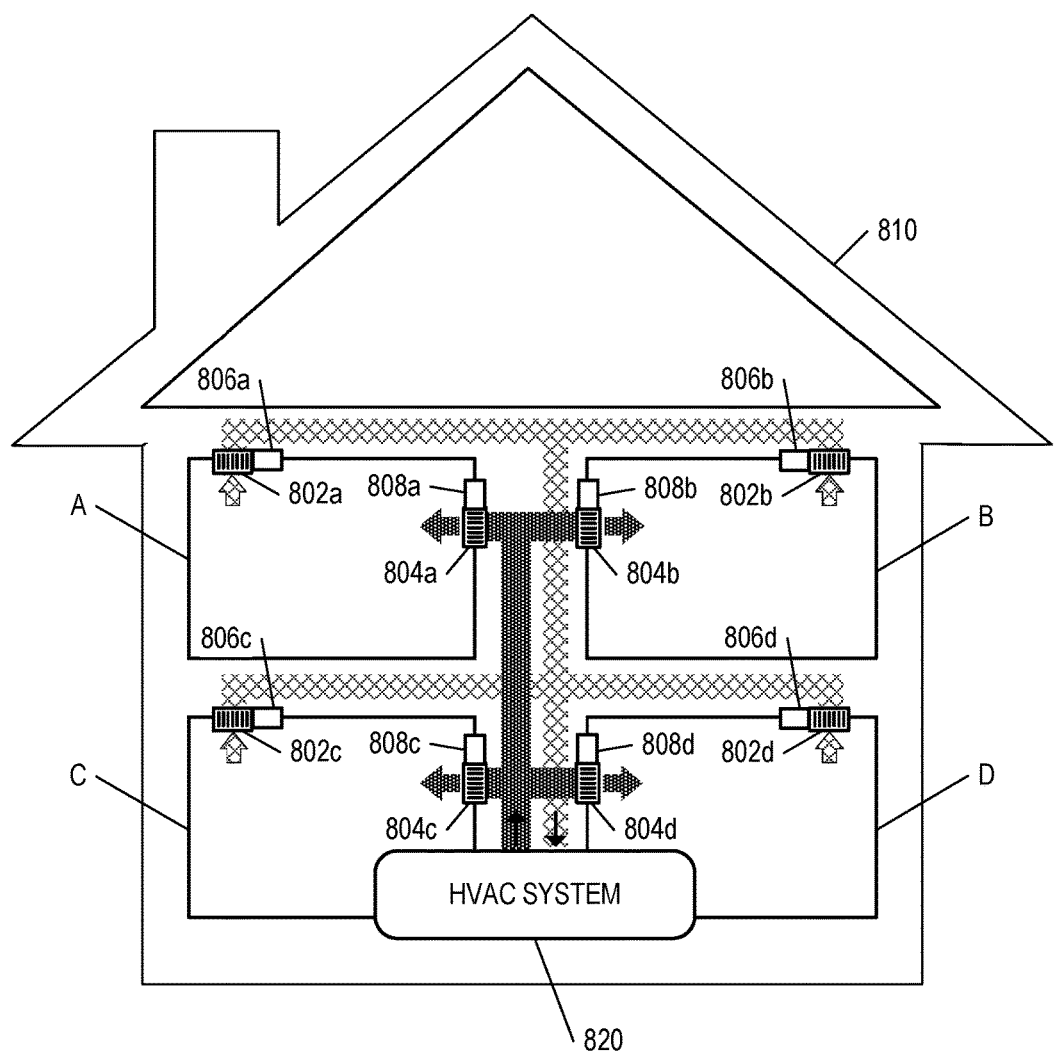
FIG. 8 illustrates an example of a diagram of a property.

FIG. 8 illustrates an example of an airflow diagram of an HVAC system 820 within a property 810. As depicted, the property 810 includes regions A, B, C, and D, which represent various divisions within the property 810 (e.g., rooms) that have dedicated HVAC vents for each region. For instance, the regions A-D each include respective source vents 804 that supply air generated by the operation of the HVAC system 120, and respective return vents 802 that circulate air from the regions A-D back to HVAC system 120. Each source vent 804 and return vent 802 also corresponding sensors 808 and 806, which collect various measurements at or near the vents. In some instances, the sensors 806 and 808 may correspond to the sensors 124 as described previously with respect to FIG. 1.

The sensors 806 and 808 are configured to collect various measurements associated with the operation of the HVAC system 820 within the property 810. For instance, as described previously with respect to FIG. 1, the sensors 806 and 808 may measure temperature, humidity, airflow, among other parameters that are associated with HVAC performance. In addition, each of the sensors 806a-d and 808a-d may collect region-specific data associated with the source and return vents located within each region. The data collected by each of the sensors 806a-d and 808a-d may be transmitted to a control unit of the HVAC system 820 (e.g., the monitor control unit 110) to adjust the operation of the HVAC system 820 in response to the collected data.

The data collected by the sensors 806a-dd and 808a-d can be used to detect overall abnormalities in operation of the HVAC system 820 (e.g., inefficient operation), or region-specific abnormalities associated with the operation of the HVAC system 820 that may not necessarily reflect malfunctioning of the HVAC system 820. For example, if the collected data indicates that a particular abnormality is present in two or more of the regions A-D, then the monitoring system may determine that there may be abnormalities associated with the HVAC system 820. In another example, if the collected data indicates that a particular abnormality (e.g., a return vent temperature being significantly lower than a source vent temperature during a HVAC heating operation) is detected only in region B, then the monitoring system 100 may then determine that the problem may not be associated with the HVAC system 820 but instead on insulation in the walls enclosing the region B. In this regard, the data collected by the sensors 806a-d and 808a-d may be used to perform diagnostics to distinguish between different types of issues that may impact HVAC system performance.

The data collected by the sensors 806a-d and 808a-d may include multiple parameters (e.g., temperature, humidity, water vapor, airflow, etc.), which can be associated with one another to identify abnormalities associated with operation of specific components of the HVAC system 820. For example, the monitoring system may perform an initial calibration procedure of the HVAC system 820 after installation to measure reference parameters that are each associated with a particular component of the HVAC system 820. The data collected by the sensors 806a-d and 808a-d can subsequently be compared to reference parameters to identify individual components that may be malfunctioning and/or inefficiently operating. In this regard, the data collected by the sensors 806a-d and 808a-d can be used to identify abnormalities associated with individual components to preemptively perform maintenance operations before the abnormalities lead to major system malfunctions that are significantly more expensive to repair.

Figure 9:
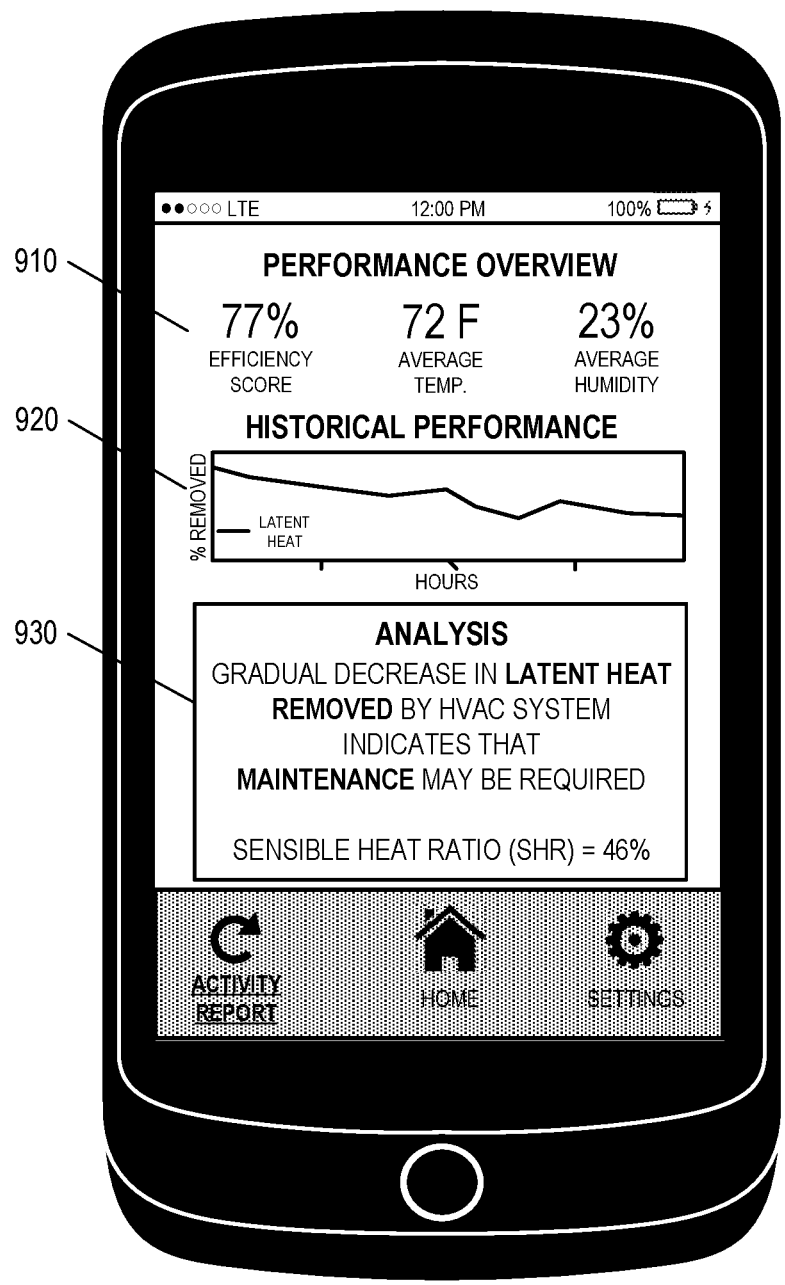
FIGS. 9-10 illustrate examples of user interfaces associated with enthalpy measurements
Figure 10:
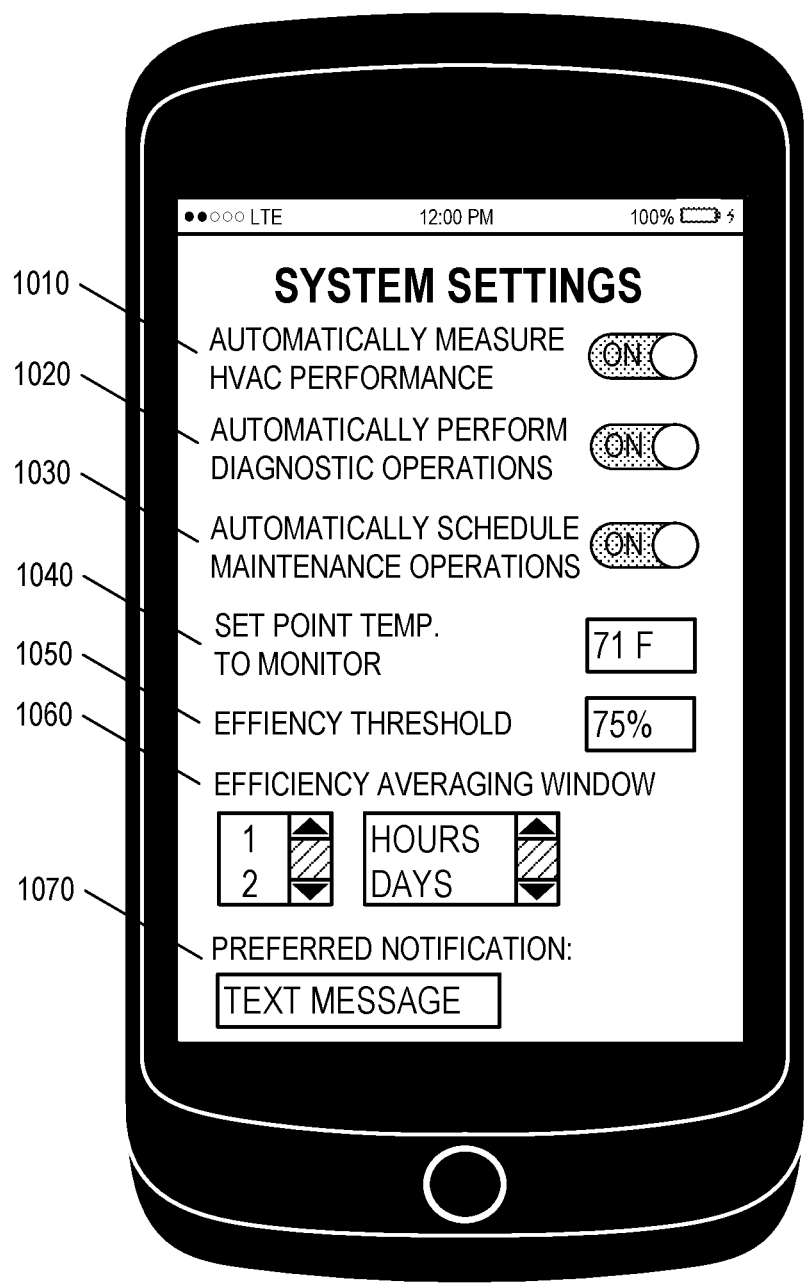

FIGS. 9-10 illustrate examples of user interfaces 900-1000 associated with enthalpy measurements. In particular, FIG. 9 illustrates an example of a user interface 900 that include activity reports indicating HVAC performance based on computed enthalpy measurements, and FIG. 10 illustrates an example of a user interface 1000 that enables a user to configure system settings associated with computing enthalpy measurements.

Referring initially to FIG. 9, the interface 900 may include measured performance data 910, historical performance data 920, and a performance analysis 930. The measured performance data 910 can include a performance assessment based on data collected by sensors associated with a HVAC system (e.g., a performance efficiency score), values that indicate present conditions at or near a property where the HVAC system is located (e.g., average temperature), and/or measurements that summarize instantaneous sensor measurements over a particular period of time (e.g., average humidity).

The historical performance data 920 can include one or more data visualizations that provide instantaneous sensor measurements over a period of time to depict performance patterns, and/or possible abnormalities of the HVAC system as depicted previously with respect to FIGS. 3A-3B. In the example depicted in FIG. 9, the historical performance 920 includes a visualization that provides latent heat computations on an hourly basis. The visualization indicates that latent heat removal by the HVAC system has progressively decreased at a slow rate, indicating possible deteriorating operation of the HVAC system over time. In other examples, the rate of change of a visualized parameter can be used to indicate other types of performance indicators. For instance, if the historical performance data indicates sharp changes, then this may indicate major component malfunctions that require immediate maintenance service.

The performance analysis 930 includes a recommendation to a user that maintenance on the HVAC system may be required in order to prevent damage to the system due to the deterioration. In addition, the performance analysis 930 specifies a measured sensible heat ratio (SHR), which describes the ratio of sensible heat load to total heat load. For instance, a SHR value of 100% indicates that an evaporator of the HVAC system only cools the air (e.g., a purely sensible heat load), whereas a SHR value of 80% indicates that 80% of the evaporator load is used for cooling air (sensible load), while the remaining 20% is used to provide dehumidification (latent load). In some instances, the SHR value computed by the system may be used to augment and/or supplement the recommendation provided to the user within the performance analysis 930.

Referring now to FIG. 10, the interface 1000 may include configuration settings 1010-1060 that each adjust the procedure by which a monitoring system of a property (e.g., the system 100) computes enthalpy measurements associated with a HVAC system of the property. For example, configuration setting 1010 specifies whether enthalpy measurements using processes described herein with respect to FIGS. 2 and 4-7 are performed automatically (if the configuration setting 1010 is enabled), or are performed based on a user request (if the configuration setting 1010 is disabled).

The configuration setting 1020 specifies whether the monitoring system automatically initiates a set of processes to perform diagnostic procedures in response to detecting an abnormality associated with operation of the HVAC system as described herein with respect to FIGS. 4 and 7. Examples of automatic diagnostic procedures may include, for example, performing system-initiated tests of the HVAC components 122 during low performance time periods (e.g., between cooling and heating cycles), or transmitting notifications indicating the results of the tests to manufacturers or service providers associated with the HVAC system.

The configuration setting 1030 specifies whether the monitoring system automatically initiates a set of processes to schedule maintenance procedures in response to detecting an abnormality associated with operation of the HVAC system as described herein with respect to FIGS. 4 and 7. For example, in response to detecting an abnormality, the system may transmit a signal to a manufacturer or service provider associated with the HVAC system to schedule a maintenance appointment and then transmit a corresponding notification to the user associated with the property where the HVAC system is located. In such examples, the user may provide periods of availability for performing maintenance operations that the system then selects for automatically scheduling maintenance operations.

The configuration setting 1040 enables a user to provide a user-defined set point temperature that is used as a reference temperature to compare against temperatures measured at the source vents and return vents of a HVAC system. For example, as described previously with respect to FIGS. 1 and 7, the user-defined set point temperature may be used as a reference parameter that indicates an expected temperature at or near the return and source vents of one or more of the regions of the property. The measured temperature at the source and return vents can then compared against the user-defined set point temperature to determine whether the HVAC system is properly functioning, and if not properly functioning, the cause of the malfunctioning. For example, a lower temperature at the source vent compared to the user-defined set point temperature during a heating cycle may indicate the heat-generating components such as the furnace of the HVAC system may be incapable of generating the requisite power to perform according to the specified requirements. In another example, a lower temperature at the return vent only during a heating cycle may indicate either that there may be issues related to insulation within the region where the sensors are located.

The configuration setting 1050 enables a user to provide a user-defined efficiency threshold that specifies a threshold percentage relative to a base HVAC performance measurement over a time period in order to perform system-initiated actions. For instance, the efficiency threshold may be used to compare a computed HVAC efficiency, based on enthalpy measurements over a particular period of time, against a predetermined efficiency that is associated with normal performance. The system ensures that the particular period of time is set to a time period long enough for efficiency percentages and thresholds to be meaningful, and avoid reacting to temporary spikes in efficiency. For instance, the particular period of time may be a full day, a full week, or a full month and the analysis includes day-to-day, week-to-week, or month-to-month assessments of efficiency. In the example depicted, if a value computed HVAC efficiency is greater than 75% of the value of the predetermined efficiency (e.g., day-to-day efficiency is maintained above 75%), then the system may determine that no problems currently exist with the HVAC system. Alternatively, if the value of the computed HVAC efficiency falls below 75% of the value of the predetermined efficiency (e.g., day-to-day efficiency falls below 75%), the system instead may determine that an abnormality exists with the operation of the HVAC system.

The user-defined efficiency threshold can also be used to adjust the sensitivity of enthalpy measurement and system control techniques by changing the requirements for the system to determine a possible abnormality associated with operation of the HVAC system. As an example, an efficiency threshold of 80% can be used to determine small differences in efficiency (e.g., 20% difference), whereas an efficiency threshold of 50% can be used to determine larger scale performance issues that are likely to cause system failure if not immediately addressed. A user may reduce the efficiency threshold to identify abnormalities that are determined to be severe in order to conserve system resources necessary to compute enthalpy measurements.

In some implementations, instead of being user-selectable, the efficiency threshold may be dynamically and automatically adjusted based on the operation of the HVAC system in relation to seasonal changes. For example, the efficiency threshold may be increased during seasonal periods of low HVAC activity based on determining that the performance of the HVAC system is unlikely to be impacted during such time periods, whereas the efficiency threshold may be reduced during seasonal periods of high HVAC activity based on determining that the increased HVAC activity is likely to cause some impacts on HVAC performance.

The configuration setting 1060 enables a user to define the time period over which individual enthalpy measurements are averaged in order to compute an efficiency associated with the HVAC system. For example, as described previously with respect to FIG. 7, in some implementations, the system periodically computes enthalpy measurements over a user-defined time period and then averages the periodic measurements in order to compute an average efficiency measurement. In such implementations, the configuration setting 1050 enables a user to specify the frequency of computing efficiency measurements. For example, a user or the system may set the window to assess daily, weekly, or monthly efficiency changes.

The configuration setting 1070 enables a user to provide a preferred method of providing system-generated notifications in response to determining abnormalities associated with HVAC system operation based on computed enthalpy measurements. For instance, the system-generated notifications can be transmitted through one or more of an email, text message, or a notification associated with a native application running on the user devices 140, 150. In some instances, the configuration setting 1060 may additionally specify preferred recipients to receive the system-generated notification. For instances, recipients can include an authorized user such as a property owner, property manager, or a recipient, along with other individuals or entities that provide services that are associated with the HVAC system such as individuals from property management companies, the manufacturer or service provider of the HVAC system. In this regard, the configuration setting 1060 enables a user to customize the way in which the system delivers data and information associated with abnormalities The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computers, the method comprising:
   obtaining, from one or more sensors associated with a heating, ventilating, and air conditioning (HVAC) system, (i) temperature data including a source vent temperature measurement and a return vent temperature of the HVAC system, and (ii) humidity data including a source vent humidity measurement and a return vent humidity measurement of the HVAC system;
   computing, based at least on the obtained temperature data and the humidity data, an enthalpy measurement associated with operation of the HVAC system;
   determining that the computed enthalpy measurement indicates an efficiency issue associated with operation of the HVAC system; and
   in response to determining that the computed enthalpy measurement indicates the efficiency issue associated with operation of the HVAC system, taking action related to the HVAC system,
   wherein determining that the computed enthalpy measurement indicates an efficiency issue associated with operation of the HVAC system comprises:
      comparing the obtained temperature data against reference data that includes a user-defined set point temperature;
      determining that a difference between a value of the user-defined set point temperature and a value of either the return vent temperature or the source vent temperature exceeds a predetermined threshold; and
      in response to determining that the difference exceeds the predetermined threshold, identifying an efficiency issue associated with operation of the HVAC system.

2. The method of claim 1, wherein:
   obtaining the temperature data and the humidity data comprises periodically obtaining the temperature and humidity data over a particular period of time; and determining that the computed enthalpy measurement indicates an efficiency issue associated with operation of the HVAC system comprises determining that the computed enthalpy measurements indicates an efficiency issue associated with operation of the HVAC system over the particular period of time.

3. The method of claim 1, wherein the enthalpy measurement comprises an amount of sensible heat removed by the HVAC system from at least a portion of a property associated with the HVAC system.

4. The method of claim 1, wherein the enthalpy measurement comprises an amount of latent heat removed by the HVAC system from at least a portion of a property associated with the HVAC system.

5. The method of claim 1, further comprising computing a relative HVAC system efficiency score based at least on the computed enthalpy measurement.

6. The method of claim 5, wherein the HVAC system efficiency score indicates heating or cooling losses that contribute to system inefficiency associated with operation of the HVAC system.

7. The method of claim 5, wherein computing the relative HVAC system efficiency score comprises comparing the obtained temperature data and humidity data to reference temperature data and reference humidity data that are each associated with predetermined efficient operation of the HVAC system.

8. The method of claim 1, wherein the one or more sensors associated with the HVAC system comprise an anemometer that determines a volumetric airflow produced by the HVAC system.

9. The method of claim 8, further comprising:
obtaining, from the anemometer, airspeed data that includes a source vent airspeed measurement and a return vent airspeed measurement associated with the HVAC system; and
computing the enthalpy measurement associated with operation of the HVAC system is based at least on the obtained airspeed data.

10. A system comprising:
one or more computers; and
one or more storage devices storing instructions that, when executed by the one or more computers, cause the one or more computers to perform operations comprising:
obtaining, from one or more sensors associated with a heating, ventilating, and air conditioning (HVAC) system, (i) temperature data including a source vent temperature measurement and a return vent temperature of the HVAC system, and (ii) humidity data including a source vent humidity measurement and a return vent humidity measurement of the HVAC system;
computing, based at least on the obtained temperature data and the humidity data, an enthalpy measurement associated with operation of the HVAC system;
determining that the computed enthalpy measurement indicates an efficiency issue associated with operation of the HVAC system; and
in response to determining that the computed enthalpy measurement indicates the efficiency issue associated with operation of the HVAC system, taking action related to the HVAC system,
wherein determining that the computed enthalpy measurement indicates an efficiency issue associated with operation of the HVAC system comprises:
comparing the obtained temperature data against reference data that includes a user-defined set point temperature;
determining that a difference between a value of the user-defined set point temperature and a value of either the return vent temperature or the source vent temperature exceeds a predetermined threshold; and
in response to determining that the difference exceeds the predetermined threshold, identifying an efficiency issue associated with operation of the HVAC system.

11. The system of claim 10, wherein:
obtaining the temperature data and the humidity data comprises periodically obtaining the temperature and humidity data over a particular period of time; and
determining that the computed enthalpy measurement indicates an efficiency issue associated with operation of the HVAC system comprises determining that the computed enthalpy measurements indicates an efficiency issue associated with operation of the HVAC system over the particular period of time.

12. The system of claim 10, wherein the enthalpy measurement comprises an amount of sensible heat removed by the HVAC system from at least a portion of a property associated with the HVAC system.

13. The system of claim 10, wherein the enthalpy measurement comprises an amount of latent heat removed by the HVAC system from at least a portion of a property associated with the HVAC system.

14. The system of claim 10, wherein the operations further comprise computing a relative HVAC system efficiency score based at least on the computed enthalpy measurement.

15. The system of claim 14, wherein the HVAC system efficiency score indicates heating or cooling losses that contribute to system inefficiency associated with operation of the HVAC system.

16. The system of claim 14, wherein computing the relative HVAC system efficiency score comprises comparing the obtained temperature data and humidity data to reference temperature data and reference humidity data that are each associated with predetermined efficient operation of the HVAC system.

17. The system of claim 10, wherein the one or more sensors associated with the HVAC system comprise an anemometer that determines a volumetric airflow produced by the HVAC system.

18. The system of claim 17, wherein the operations further comprise:
obtaining, from the anemometer, airspeed data that includes a source vent airspeed measurement and a return vent airspeed measurement associated with the HVAC system; and
computing the enthalpy measurement associated with operation of the HVAC system is based at least on the obtained airspeed data.

* * * * *